No. 832,520. PATENTED OCT. 2, 1906.
F. C. WOODS.
FISH HOOK.
APPLICATION FILED JUNE 13, 1906.

Witnesses

Inventor
F. C. Woods,
By Victor J. Evans.
Attorney

UNITED STATES PATENT OFFICE.

FRANKLIN C. WOODS, OF ALLIANCE, OHIO.

FISH-HOOK.

No. 832,520. Specification of Letters Patent. Patented Oct. 2, 1906.

Application filed June 13, 1906. Serial No. 321,482.

*To all whom it may concern:*

Be it known that I, FRANKLIN C. WOODS, a citizen of the United States, residing at Alliance, in the county of Stark and State of Ohio, have invented certain new and useful Improvements in Fish-Hooks, of which the following is a specification.

This invention relates to improvements in fish-hooks, and particularly hooks of the compound type designed for use in connection with artificial bait or minnows, the object of the invention being to provide a simple and effective form of guard for hooks of this character to prevent the points of the hook touching and scratching the body of the bait and to also hold the hook always in position to receive strikes.

Figure 1:
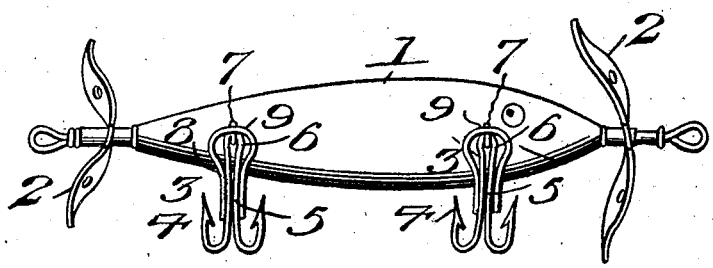
Figure 2:
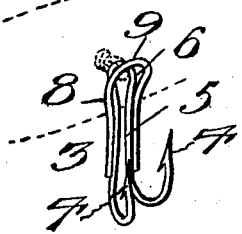

In the accompanying drawings, Figure 1 is a side view of an artificial bait embodying my invention. Fig. 2 is a detail view of one of the hooks thereon, a portion of the body being indicated by dotted lines.

Referring to the drawings, the numeral 1 designates the body of the bait, which may be in the form of a minnow or of any other suitable form and be provided with revoluble lure devices 2 of any preferred construction and nickel-plated or otherwise finished to attract the fish.

Each hook 3, of which any desired number may be employed, is of the double type, having two barbed points 4 and a looped body 5, forming a shank common to both points. The hook as thus constructed is preferably formed from a single piece of wire bent into the described shape, with the ends thereof terminating in the barbed points. The members of the shank are slightly contracted at an intermediate point to form at the bight of the loop a nearly-closed eye 6 to pivotally engage a suspending-eye 7 on the bait 1, thus allowing the hook to have freedom of swinging motion in the usual way.

The guard comprises a looped wire 8, having its arms lying on the outer sides of and secured to the arms or members of the shank 5 and the return-bend or bight portion 9 thereof projecting slightly above the eye 6, so that when the hook swings outwardly and upwardly the part 9 will contact with the bait 1 and limit such movement of the hook, thus preventing the points 4 from coming in contact with and scratching and otherwise injuring the bait. The contact portion 9 of the guard is preferably enlarged and offset to project outwardly from the eye 9, so that it will not interfere with the pivotal movement of the hook and will allow the latter to swing upward to an ample extent. The guard may be soldered or otherwise secured to the hook and will effectually prevent the same from scratching the painted surface of the bait and marring the same and will also serve as a limitation-stop and counterweight to normally hold the hook with its points directed outward to receive strikes.

It will of course be understood that the guard may be used in connection with a hook of any desired type to which it is adapted to be applied to perform its described functions.

Having thus described the invention, what is claimed as new is,—

1. The combination with an artificial bait, and a hook having pivotal movement thereon, of a guard upon the hook to limit such pivotal movement.

2. The combination with an artificial bait, and a hook having pivotal movement thereon, of a looped guard upon the hook to limit such pivotal movement.

3. The combination with an artificial bait, and a hook having pivotal movement thereon, of a guard applied to the shank of the hook and having a contact portion to engage the bait to limit such pivotal movement.

4. The combination with an artificial bait, and a hook having pivotal movement thereon, of a looped guard upon the hook having an enlarged offset contact portion adapted to engage the bait to limit the swing of the hook.

5. The combination with an artificial bait, and a double hook having pivotal movement thereon, of a looped guard connected with the shank of the hook, the bight portion of the guard forming a contact member to engage the bait and limit the swing of the hook.

6. The combination with an artificial bait, and a hook having pivotal movement thereon, of a counterweight-guard upon the hook to engage the bait and limit the swing of the hook and to normally maintain the hook in operative position.

7. A hook having a guard rigid therewith and forming a stop to limit the swing thereof.

8. A hook having a looped guard applied to the shank thereof with its bight portion projecting to form a stop.

9. A double hook having a shank and an eye, and provided with a looped guard, the arms of the guard being secured to the shank of the hook and the bight of the guard arranged adjacent the eye of the hook to form a stop.

FRANKLIN C. WOODS.

Witnesses:
C. C. SHAFFER,
H. H. WOODS.